United States Patent [19]

Birkner

[11] 4,053,130

[45] Oct. 11, 1977

[54] ATTACHMENT ARRANGEMENT FOR ELECTRONIC APPARATUS TO A SUPPORT WALL

[75] Inventor: Udo Birkner, Heinde, Germany

[73] Assignee: Blaupunkt-Werke GmbH, Hildesheim, Germany

[21] Appl. No.: 702,985

[22] Filed: July 6, 1976

[30] Foreign Application Priority Data

July 5, 1976 Germany .............................. 2530199

[51] Int. Cl.² ........................ H01R 13/60; H01R 9/16
[52] U.S. Cl. ................................... 248/27.3; 339/128
[58] Field of Search ............... 248/27.1, 27.3; 85/5 N, 85/5 P; 339/128; 24/208 A, 73 SB; 312/242; 73/431, 273; 220/3.5, 3.6

[56] References Cited

U.S. PATENT DOCUMENTS

| 2,546,090 | 3/1951 | Darnell ............................ 248/27.1 X |
| 2,799,170 | 7/1957 | Davis ............................... 248/27.1 X |
| 3,2..,.. | 4/1966 | Eisenberg .......................... 248/27.3 |
| 3,731,260 | /1973 | Nardone ........................... 248/27.3 X |
| 3,770,925 | 11/1973 | Nelson ............................. 248/27.1 X |
| 3,903,458 | 9/1975 | Arnoux ............................ 248/27.1 X |
| 3,935,637 | 2/1976 | Bunnell ............................ 248/27.1 X |
| 3,989,343 | 11/1976 | Lucius ............................. 248/27.3 X |

FOREIGN PATENT DOCUMENTS 2,003,206  11/1969  France ............................. 248/27.1

Primary Examiner—J. Franklin Foss
Attorney, Agent, or Firm—Flynn & Frishauf

[57] ABSTRACT

To permit mounting automobile radios and other accessories on support panels of different thicknesses with a single fitting element which determines the position of the accessory in an opening formed in the panel, the fitting element is formed with a front wall from which lateral wall portions extend at approximately right angles, the lateral wall portions being formed with an overlapping edge to engage around the edge of the opening in the support wall of the automobile; the accessory attached thereto is clamped to the front wall by spring elements which engage a tapered, serrated holding surface, the serrations being staggered in a direction extending between the overlapping edge and the front wall of the fitting element so that the spring elements, typically spring wires, will hold the fitting element, and hence the accessory by engagement with that serration which fits against the rear surface of the support wall of the automobile, in the light of its thickness.

12 Claims, 7 Drawing Figures

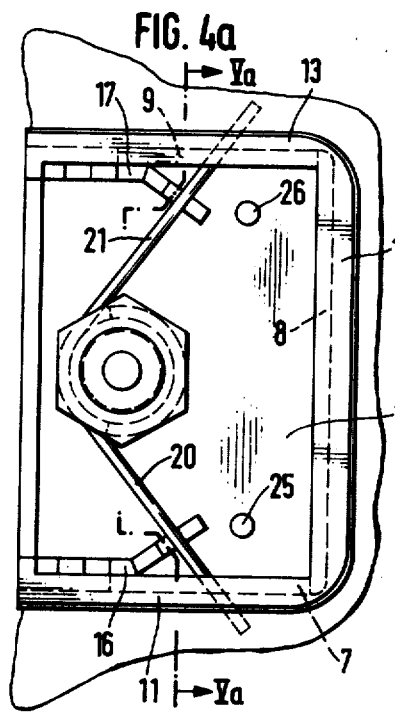
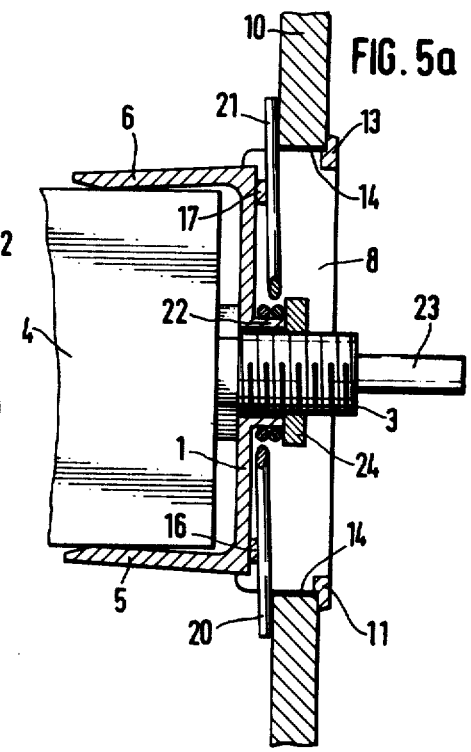
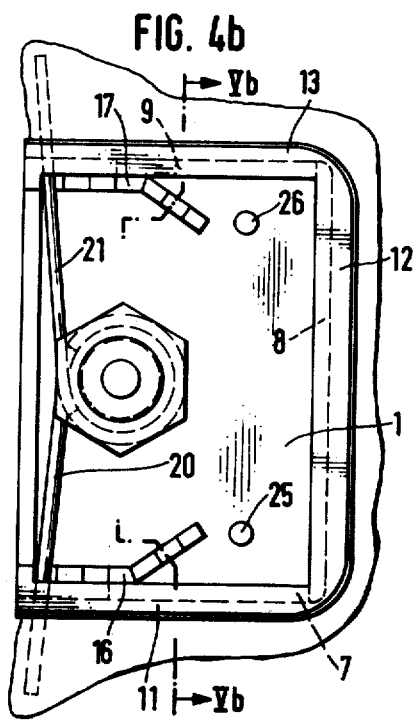
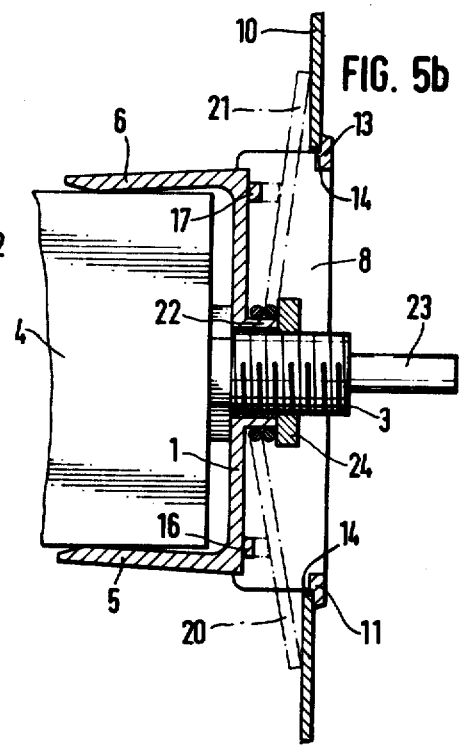

ATTACHMENT ARRANGEMENT FOR ELECTRONIC APPARATUS TO A SUPPORT WALL

The present invention relates to an attachment arrangement to secure an electronic apparatus in an opening formed in a support wall, and more particularly to an attachment arrangement for automobile radios and other similar electronic entertainment accessories.

It has previously been proposed to provide fitting elements for automobile radios and the like which fit into openings located on the instrument panel of a vehicle, thus determining the position of the radio. These fitting elements have outwardly directed edge portions which overlap the outer surface of the instrument panel wall to form a front support. The overall fitting should be so constructed that the radio, or other entertainment accessory can be rapidly secured in openings formed in the instrument panel using, preferably, no special tools and permitting easy and fast installation.

The invention will be described herein with specific reference to automobile radios, although it is to be understood that it is equally applicable to other types of devices or apparatus to be secured to a support wall formed with an opening through which the accessory or device can be introduced from the front thereof, and to hold the device. Thus, in the specification hereafter, the terms "radio" and "instrument panel" are to be understood to be illustrative of a typical device for attachment to a typical wall, without being limited to the particular elements involved. In particular, cover panels to cover the opening with a dummy plate, usually of decorative shape, are also to be included within the scope of the invention, such dummy panels being used if a predetermined opening is to be covered if, for example, the customer of a vehicle does not desire to purchase a radio for which the opening has been made.

Automobile radios, usually, have two forwardly extending shaft elements for tuning and loudness control and, if one of the shaft elements includes concentric shafts, possibly also for tone or multiple speaker fade controls. These shaft elements are customarily surrounded by threaded sleeves. The threaded sleeves are used to secure the radio in the support wall and additionally to attach the dial or face plate thereto.

It has previously been proposed to secure the radio in the instrument panel of an automobile by providing fixed springs at the side of the housing of the radio, the springs extending forwardly and diverging outwardly. The radio is then introduced into the opening; the laterally extending portions of the leaf spring are pressed against the housing of the radio during introduction thereof through the fitting opening from the front side. When the radio is positioned, the springs snap outwardly and engage the rear surface of the support wall, or the rearward edges of the opening. The radio is secured in position by counter-pressure against the turned-over edges formed on the radio, on the fitting, or on the dial face plate and fitting around the front surface of the instrument panel. Holders of this type are efficient and simple; they work, however, only with instrument panels of a single wall thickness and thus are limited in their use; this is a substantial disadvantage since the wall thicknesses of instruments panels of various makes and models of automobiles vary widely, and the attachment, as proposed, can be arranged only for a panel of a single thickness to provide for reliable and effective engagement of the radio.

It is an object of the present invention to provide a holding arrangement to secure a radio or other accessory to the instrument panel of an automobile, or a support wall of any kind, in which the thickness of the support wall may vary widely.

SUBJECT MATTER OF THE PRESENT INVENTION

Briefly, fitting elements are attached to the radio or accessory, the fitting element being formed with internal inclined surfaces which, preferably, are serrated, against which holders engage which extend beyond the fitting element itself so that the holder can fit against a rear surface of the instrument panel or other support wall, preferably by engaging in a notch of the serration.

The holder is simple and permits installation of the accessory or radio in walls of widely varying wall thickness, can be easily made, for example by injection molding of plastic and uses only few, readily manufactured and assembled components, while permitting easy assembly without requiring special tools, so that the installation of a radio in the instrument panel of an automobile can be carried out quickly and inexpensively.

The invention will be described by way of example with reference to the accompanying drawings, wherein:

FIG. 4a is a front view of the fitting element similar to FIG. 1, with holding springs installed and showing, in solid lines, installation to an instrument panel of substantial thickness;

FIG. 4b is a front view of the fitting element similar to FIG. 1 with holding springs installed and showing installation to a thin instrument panel;

FIG. 5a is a cross-sectional view along line Va—Va of FIG. 4a;

FIG. 5b is a cross-sectional view along lines Vb—Vb of FIG. 4b.

Figure 2:
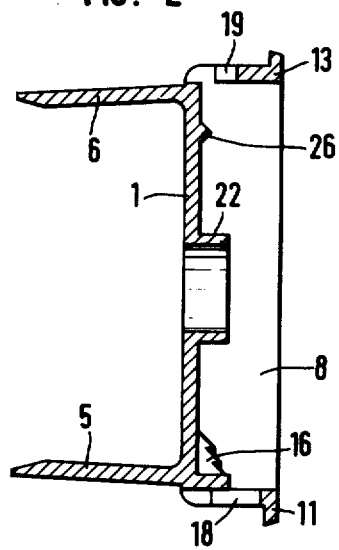
FIG. 2 is a sectional view through line II—II of FIG. 1.

The fitting element is, preferably, a single injection molding and box-shaped with a front wall 1 against which the front side of an automobile radio is to be attached. The front wall 1 is formed with a central opening 2, preferably extended as a boss 22 (FIG. 2) through which a threaded sleeve 3 (FIG. 5) of a radio can fit. The fitting element is formed at its rear side with at least two projecting wall portions 5, 6, fitting over the top and bottom walls of the radio. Walls 5, 6 preferably are springy. The wall 1 of the fitting element further has three forwardly extending walls 7, 8, 9. These walls are formed with turned-over edges 11, 12, 13, extending roughly in the plane of the front wall 1 and arranged to fit over the forward or outwardly directed surface of the support wall 10 (FIG. 5) to which the radio is to be attached. The edge portions 11-13 fit over the edge 14 of the opening formed in the instrument panel wall 10 to provide a neat, finished fit and to allow for small variations in size.

Figure 3:
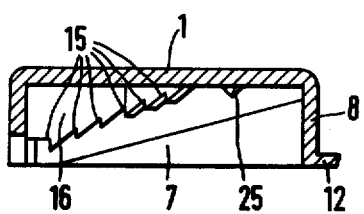
FIG. 3 is a sectional view along line III—III of FIG. 1.

In accordance with the invention, two elements 16, 17 with inclined surfaces project from the plane of plate 1. The inclined surfaces of the elements 16, 17 are serrated and are formed with engagement notches 15 (FIG. 3) arranged to be located opposite each other, as is clearly apparent in FIGS. 1 and 4. The walls 7, 9, adjacent the inclined elements 16, 17, are formed with lateral openings 18, 19 through which holding springs 20, 21 may extend. The holding springs 20, 21 are made of spring wire formed with a round eye at one end. The eye of the respective holder 20, 21 is slipped around the boss 22 (FIGS. 2, 5) surrounding the opening 2 of plate 1. Boss 22 forms a bearing for the holding wires 20, 21 and permits rotation of the wires about boss 22. The fitting is designed to secure a radio which, as customary, has an operating shaft element 23 (which may, in turn, be formed as two concentric shafts) surrounded by an outwardly threaded sleeve 3 (FIG. 5). Two such elements may be connected together to form a single assembly, for example by extension of the respective walls 7, 9 and the molded-on overlapping edge 11, 13, as illustrated at 30 in FIG. 1. Other connecting elements may be used.

Assembly of an automobile radio to an instrument panel: Respective fitting elements are slipped over the threaded sleeves 3 of the radio receiver in such a manner that the lower and upper side wall portions 5, 6 resiliently engage the lower and upper walls of the receiver. Two holders 20, 21, each, are slipped around the respective bosses 22. The fitting elements, with the holders 20, 21 installed, are then secured to the radio by threading nuts 24 (FIG. 5) on the sleeve 3 surrounding the operating shaft element 23. The holders 20, 21, rotatable about boss 22, are deflected internally against projecting notches 25, 26 (FIGS. 1, 3, 4) so that the outer ends of holders 20, 21 fall within the outline of the front wall 1 of the fitting element.

The radio, with the fitting elements attached, is now introduced into the instrument panel wall until the edges 11, 12, 13 of the walls 7, 8, 9 of the fitting elements engage the front surface of the wall 10. Referring now specifically to FIGS. 4 and 5: After the edges 11, 12, 13 have engaged the front surface of wall 10, a tool, for example long-nose pliers, or the like, are used to move the holders backwardly away from the respective stop 25, 26 to engage the inclined surface of the respective inclination elements 16, 17 until the outer edges of the respective holder 20, 21 engages the rear surface of the wall 10. Due to the inclined surfaces, and particularly if formed with serrations (FIG. 3) installation in support walls 10, that is, in instrument panels of widely varying thickness, is readily possible. FIGS. 4, 5 illustrate the position of the holders 20, 21 for two different instrument panels in full and broken-line positions, in which the full-line position shows installation in a thick instrument panel, and the broken-line position installations against a thin instrument panel.

Holders 20, 21 can be shaped in various ways; for example, they need not be made to rotate about a boss 22, as shown, but could be fixed in position, deflection being effective by resilient deformation of the holders; the boss 22, also, is not strictly necessary. The holders 20, 21 may be circular or polygonal, for example square spring wire, or may be eccentric elements.

Figure 1:
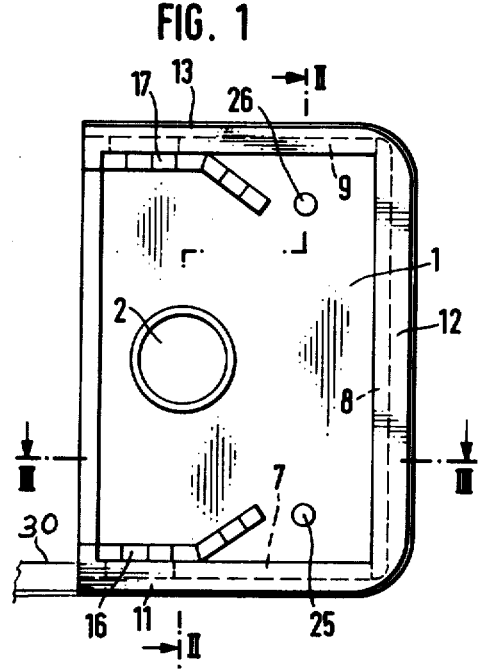
FIG. 1 is a front view of one of two fitting elements for use in attaching a radio to an instrument panel, the other fitting element being identical and merely turned upside down.

For mass production for specific radio apparatus, two fittings as shown in the FIGS. are preferably made as a unitary element, connected by connecting bridges 30, of which one only is shown in FIG. 1; the bridge having been omitted from the other drawings for the sake of clarity.

Various changes and modifications may be made within the scope of the inventive concept.

I claim:

1. Attachment arrangement for electronic apparatus (4) to a support wall (10) in which the support wall is formed with an opening to introduce the apparatus therethrough,
wherein the electronic apparatus (4) is formed with cylindrical threaded sleeves (3), comprising
a fitting element determining the position of the apparatus (4) in the opening and supporting the apparatus having
a front wall (1) formed with an opening (2) therein;
means (22; 5, 6) secured to the front wall (1) locating and supporting the apparatus on the fitting element;
wall portions (7, 8, 9) extending from the front wall in the direction away from the apparatus when located in position said wall portions being formed with turned-over edges (11, 12, 13) adapted to fit over the edges of the opening in the support wall (10);
means clamping said fitting element including at least one tapered holding element formed on the wall (1) of the fitting element having a tapered or inclined surface extending at an inclination with respect to the major plane of the front wall;
and movable housing means (20, 21) secured to the front wall (10) and having a length to extend beyond the edges (14) of the opening in the support wall and engageable with said tapered, inclined surface of the tapered holding element (16, 17), the holding means being movable within the outline of the opening to permit insertion of the fitting element and the electronic apparatus secured thereto into the opening of the support wall and then move said holding means in engagement with the rear surface of the support wall (10) and engage said holding means against the inclined surface of the tapered holding element (16, 17) to secure the fitting element against the front surface of the support wall (10) by engagement of said turned over edges (11, 12 13) and engagement of the holding means (20, 21) against the rear surface of the support wall, the holding means being positioned by the inclination or taper of the respective tapered holding element,
said holding means comprising wire-shaped elements having an eye at one end thereof, and the holding elements being secured to the fitting element such that the axes of the eye, and of the threaded sleeve (3) are coincident and the threaded sleeve axis forms a rotating axis for the holding element.

2. Attachment arrangement according to claim 1, wherein the tapered holding elements are formed with serrations, and the holding means (20, 21) are resilient or springy and shaped to fit into the notches of the serrations.

3. Attachment arrangement for an automobile electronic accessory comprising
the arrangement of claim 2
wherein the accessory forms the electronic apparatus.

4. Attachment arrangement according to claim 1, further comprising guide wall portions (5, 6) integral with the front wall (1) and extending at approximately right angles thereto in a direction of the apparatus (4), the guide wall portions being resilient and resiliently engaging said apparatus (4).

5. Attachment arrangement according to claim 1, wherein said fitting element comprises an integral injection molding.

6. Attachment assembly for electronic apparatus comprising two attachment arrangements
as claimed in claim 1
and connecting strips (30) formed on the fitting elements of the attachment arrangements and connecting said attachment arrangements together.

7. Attachment arrangement for an automobile electronic accessory comprising
the arrangement of claim 1
wherein the accessory forms the electronic apparatus.

8. Attachment arrangement for electronic apparatus (4) to a support wall (10) in which the support wall is formed with an opening to introduce the apparatus therethrough,
wherein the electronic apparatus (4) is formed with cylindrical threaded sleeves (3), comprising
a fitting element determining the position of the apparatus (4) in the opening and supporting the apparatus having
a front wall (1) formed with an opening (2) therein;
means (22, 5, 6) secured to the front wall (1) locating and supporting the apparatus in the fitting element and including a boss (22) surrounding the threaded sleeve (3) formed on the front wall (1) of the fitting element surrounding said opening (2);
wall portions (7, 8, 9) extending from the front wall in the direction away from the apparatus when located in position, said wall portions being formed with turned-over edges (11, 12 13) adapted to fit over the edges of the opening in the support wall (10);
means clamping said fitting element including at least one tapered holding element formed on the wall (1) of the fitting element having a tapered or inclined surface extending at a inclination with respect to the major plane of the front wall;
and movable holding means (20, 21) secured to the front wall (10) and having a length to extend beyond the edges (14) of the opening in the support wall and engageable with said tapered, inclined surface of the tapered holding element (16, 17), the holding means being movable within the outline of the opening to permit insertion of the fitting element and the electronic apparatus secured thereto into the opening of the support wall and then move said holding means in engagement with the rear surface of the support wall (10) and engage said holding means against the inclined surface of the tapered holding element (16, 17) to secure the fitting element against the front surface of the support wall (10) by engagement of said turned-over edges (11, 12, 13) and engagement of the holding means (20, 21) against the rear surface of the support wall, the holding means being positioned by the inclination or taper of the respective tapered holding element,
said holding means (20, 21) being spring wire elements formed with an eye at one end, the eye surrounding said boss (22), the boss forming a bearing for the eye of the holding means.

9. Attachment assembly for electronic apparatus comprising two attachment arrangements as claimed in claim 8,
and connecting strips (30) formed on the fitting elements of the attachment arrangements and connecting said attachment arrangements together.

10. Attachment arrangement according to claim 8, wherein the tapered holding elements are formed with serrations, and the holding means (20, 21) are resilient or springy and shaped to fit into the notches of the serrations.

11. Attachment arrangement for an automobile electronic accessory comprising
the arrangement of claim 8
wherein the accessory forms the electronic apparatus.

12. Attachment arrangement for an automobile electronic accessory comprising
the arrangement of claim 11
wherein the accessory forms the electronic apparatus.

* * * * *